May 17, 1927.
H. H. THEIS
AUTOMOBILE SIGNAL
Filed March 28, 1925
1,629,057
2 Sheets-Sheet 1
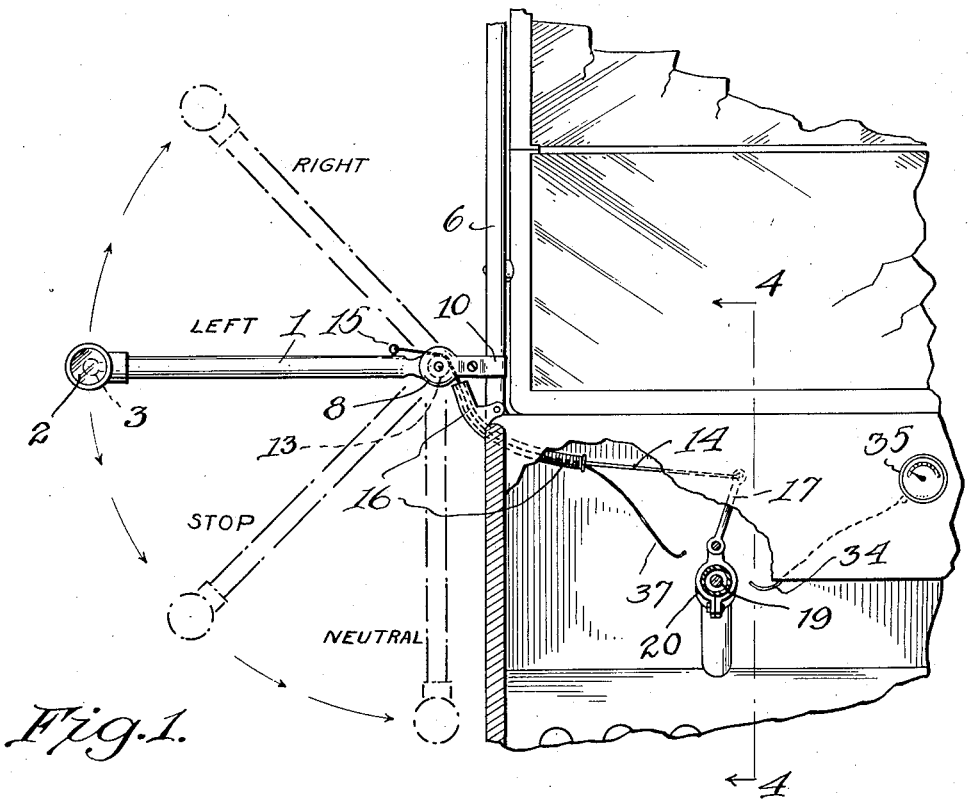
Fig.1.
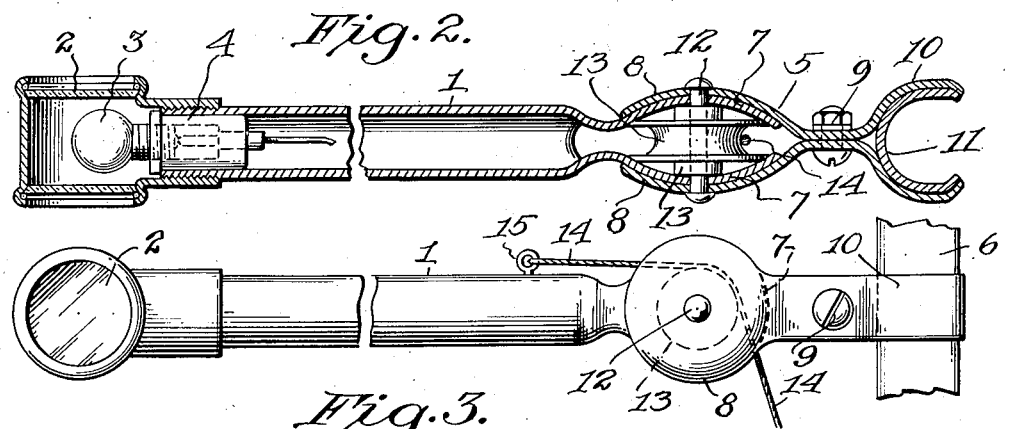
Fig.2.
Fig.3.
INVENTOR
Hugh H. Theis
BY
ATTORNEY May 17, 1927.

H. H. THEIS

AUTOMOBILE SIGNAL

Filed March 28, 1925

INVENTOR
Hugh H. Theis
BY
ATTORNEY

Patented May 17, 1927.

1,629,057

UNITED STATES PATENT OFFICE.

HUGH H. THEIS, OF TAYLOR, TEXAS.

AUTOMOBILE SIGNAL.

Application filed March 28, 1925. Serial No. 19,065.

This invention relates to direction and danger signaling mechanism for automobiles or other vehicles, one object of the invention being to provide a signal mechanism employing a vertical signal arm movable to different indicating positions, together with controlling means mounted on the steering column of the vehicle, and interconnecting means between said controlling means and said signal arm, whereby the signal arm may be readily and conveniently adjusted to its various indicating positions without requiring the driver to move out of his accustomed position or without diverting his attention from the proper operation and control of the vehicle.

A further object of the invention is to provide a signal mechanism which may be used with equal advantage and facility on open or closed cars, which is simple, reliable and efficient in use and operation, and which may be installed and maintained in working condition at a comparatively low cost.

The invention consists of the features of construction, combination and arrangement of parts, hereinafter fully described and claimed, reference being had to the accompanying drawings, in which:—

Figure 1 is a sectional elevation through one side of the body of an automobile, looking toward the instrument board and windshield and showing the application of the invention.

Figure 2 is a horizontal longitudinal section through the signal arm and its supporting bracket.

Figure 3 is a side elevation of the same.

Figure 4:
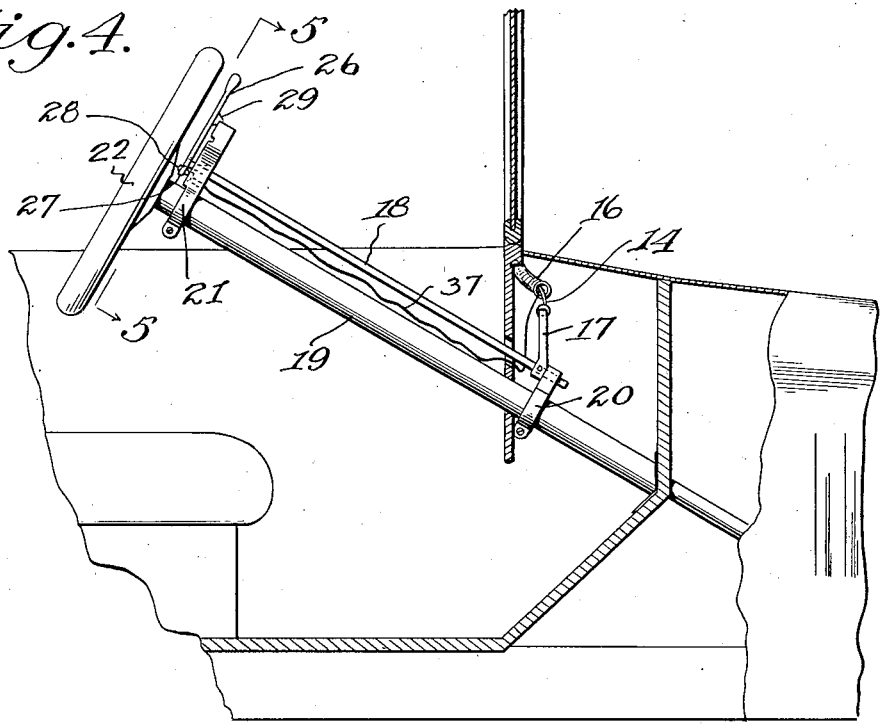
Figure 4 is a vertical longitudinal section on line 4—4 of Figure 1, illustrating the arrangement of the control means and the electric feed wire.
Figure 5:
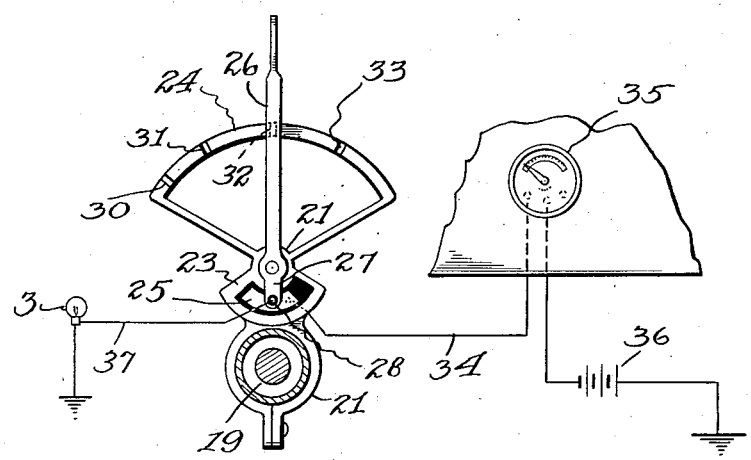
Figure 5 is a sectional view on the line 5—5 of Figure 4, showing also a diagram of the electric circuit.

In the practical embodiment of my invention, I provide a signaling mechanism comprising a signal arm 1, preferably formed of a length of tubing or piping, the outer end of which arm is suitably constructed to receive and support a lamp casing 2 within which is arranged an electric signal lamp 3, fitted within a suitable socket or base 4. The lamp casing 2 is threaded or otherwise detachably fitted on the arm 1, so that it may be removed for inspection and renewal of the lamp socket and lamp whenever occasion requires.

The arm 1 is pivotally mounted upon a bracket 5 adapted to be applied to one of the side bars 6 of the windshield frame of the vehicle, or to some other suitable part of the vehicle. The arm 1 and its bracket 5 are of novel construction to provide for the proper connection with the arm of a control cable and the guiding of said cable, as well as the mounting of the arm in such a manner as to adapt it to move freely, while at the same time maintaining a desired frictional bind at its pivotal connection in order to prevent it from sagging from a set indicating position. As shown the inner end of the tubular arm 1 is split or bifurcated at top and bottom, separating it into divisions 7 which are arcuately shaped to form resilient jaws, which jaws fit between the correspondingly shaped jaws 8 of the clamp 5. The clamp 5 is made of two properly shaped metallic sections united intermediately of their length by a bolt 9, the outer ends of said clamp sections being formed to provide the jaws 8 and the inner ends of said clamp sections being shaped to form partly circular jaws 10 adapted for engagement with the bar 6 and which may be provided with an internal lining 11 of felt, leather or other suitable flexible material providing for a clamping engagement of the jaws 10 with the bar 6 without marring or otherwise injuring the latter. The jaws 7 and 8 are centrally united by a headed or riveted axle pin 12 which holds them properly connected and forms a pivotal support for the arm 1 to adapt the same to swing within a determined range within a vertical plane. This axle also forms a support for a grooved pulley 13 which is centered thereon and held spaced from the jaws 7 by intervening distance pieces or washers 13', whereby sidewise movement of the pulley on the axle pin is prevented and said pulley mounted to revolve in a fixed plane. The jaws 7 have a tendency to outward movement by their resiliency and hence frictionally bear against the jaws 8, this frictional pressure being insufficient to prevent positive motion of the arm under a predetermined pull in an upward direction or downward motion by gravity of the arm when released for such motion, but at the same time being sufficient to almost counteract the leverage weight of the arm, whereby enough resistance to the movement of the arm is instituted to prevent it from moving with undue violence in either an upward or a downward direction or from sagging under its own weight from any position in which it is set for signaling action.

Control mechanism is provided for operating the arm and comprises a control cable 14 which is fastened at one end, as at 15, to the upper surface of the arm a short distance outwardly beyond its pivotal connection. From this point the cable extends inwardly and down over the guide pulley 13 and through a flexible guide tube 16 to the interior of the vehicle, the inner end of said cable 14 being secured to an operating crank arm 17 fastened to an oscillating rod or shaft 18 on the steering post 19. The guide tube 16 is suitably secured to the side bar 6 or side of the vehicle body and may be made of hose piping or similar material in order to adapt it to flex to a certain degree with the cable 14 in order to avoid undue wear and tear upon the cable.

The rod or shaft 18 is mounted to rock in bearing brackets 20 and 21 mounted on the steering post 19, the upper bearing bracket 21 being arranged adjacent to the steering wheel 22 and having formed therewith or carried thereby a switch segment block 23 and an indicating and lock segment 24, the block 23 having set therein and electrically insulated therefrom a segmental switch contact 25. A control lever 26 is pivotally mounted on the bracket 21 to sweep across the segment 24 and is provided with a switch arm 27 provided with a switch contact 28 to engage the contact 25. The lever is provided with a locking projection 29 adapted for engagement with any one of a series of four locking notches 30, 31, 32 and 33 in the segment 24, for locking the control lever and the signal arm against movement in their several positions of adjustment. When the projection 29 engages the notch 30 the lever 26 is at the limit of its movement in one direction, in which position the crank arm 17 is swung to its limit in the direction toward the signal arm and the cable 14 is slackened so as to allow the arm 1 to drop to its pendent neutral position. Successive movements of the lever 26 to the right, in which its projection engages notches 31, 32 and 33, will shift the crank arm 17 to different degrees to the right, whereby the signal arm may be moved to any one of three indicating positions marked Stop, Left (left turn) and Right (right turn) shown in Figure 1, and locked in such position. By reverse movements of the lever 26 it is obvious that the crank arm 17 may be shifted to relax the cable 14 to different degrees to permit recession or depression of the arm 1 from any one of its upper positions to any one of its lower or its neutral position. Hence it will be apparent that the signal arm may be readily and conveniently adjusted by the driver to indicate his intention to stop or to turn to the right or to the left without changing his position on the driver's seat or shifting his hands in such manner that control of the vehicle is liable to be lost. The bracket 21 and its parts may be disposed on the steering column at an opposite position to the throttle lever and its segment, so that all the various controls of the vehicle will be in the direct line of vision of the driver and readily accessible without interference one with the other.

The switch contact 25 is connected by a conductor 34 with the ammeter 35 or some other suitable part of the ignition circuit of the vehicle including the battery 36, and the switch contact 28 is connected by a conductor 37 with the switch terminal of the socket 4 with which the terminal of the lamp 3 makes contact, said conductor 37 extending through the guide tube and hollow arm 31, as shown clearly in Figures 1 and 2, the circuit of the lamp being completed by a ground connection with the vehicle body through the arm 1 and its supports. By this construction it will be seen that when the lever is in neutral position, and its locking projection 29 engaging the notch 30, the contact 28 will engage the insulation carried by the segment 23 beyond one end of the contact 25, and hence no current will pass to the signal lamp. When, however, the lever 26 is adjusted to any one of the three working positions in which the switch arm is adjusted for Stop or Left or Right turn signaling actions, the contact 28 will engage contact 25 and current will be supplied to the signal light to illuminate the same. This signal light may be used advantageously in both day time and night time, and particularly for night time signaling, and it will be evident that by means of the switch mechanism described the flow of current to the lamp will be automatically cut out when the switch arm is in inactive or neutral position, providing for a conservation of current when an indicating action of the lamp is unnecessary.

From the foregoing description, taken in connection with the drawings, the construction and mode of operation of my improved automobile signal device will be readily understood, and it will be seen that a device of this kind is provided which is simple of construction, capable of being applied with like facility and advantage to open and closed cars, and adapted to be operated in a ready and convenient manner by the driver for signaling actions. Also it will be seen that the device, in addition to being simple of construction, may be installed upon the vehicle in a simple and time sav-

Having thus fully described my invention, I claim:

1. In an automobile signal, a tubular signal arm having integral resilient jaws at its inner end, a supporting clamp provided with jaws embracing the jaws of the arm, an axle pin connecting said jaws, a guide pulley between the jaws of the arm and journaled on said pin, a tubular guide on the vehicle, a cable extending through said guide and between said jaws and over the pulley and attached at one end to the signal arm beyond its pivotal connection, and control means attached to the other end of the cable.

2. In an automobile signal, a bracket having spaced resilient jaws of dished formation, a signal arm having an end portion provided with jaws of dished formation lying between and frictionally engaged by the jaws of the bracket, a pivot pin passing through and axially connecting said jaws, a pulley journaled on said pin, and spacing members on the pin between the pulley and jaws of the signal arm.

In testimony whereof I affix my signature.

HUGH H. THEIS.